(12) United States Patent
Gordon et al.

(10) Patent No.: US 11,502,825 B2
(45) Date of Patent: Nov. 15, 2022

(54) SYSTEMS AND METHODS FOR USING ENTROPY DATA IN AN ELECTRIC POWER DISTRIBUTION SYSTEM

(71) Applicant: Schweitzer Engineering Laboratories, Inc., Pullman, WA (US)

(72) Inventors: Colin Gordon, Katy, TX (US); Dennis Gammel, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 17/099,894

(22) Filed: Nov. 17, 2020

(65) Prior Publication Data

US 2022/0158826 A1    May 19, 2022

(51) Int. Cl.
  *H04L 9/08* (2006.01)
  *H02J 3/00* (2006.01)

(52) U.S. Cl.
  CPC ............ *H04L 9/0819* (2013.01); *H02J 3/003* (2020.01); *H02J 3/004* (2020.01); *H04L 9/088* (2013.01); *H04L 9/0838* (2013.01); *H04L 9/0897* (2013.01)

(58) Field of Classification Search
  USPC ........ 713/168, 150, 163, 181; 726/2, 21, 36; 380/255, 264, 276
  See application file for complete search history.

(56) References Cited

U.S. PATENT DOCUMENTS

| | | | | |
|---|---|---|---|---|
| 7,729,276 | B2* | 6/2010 | Akyol | H04L 12/4633 370/252 |
| 8,819,409 | B2* | 8/2014 | Kuipers | H04L 9/3278 380/255 |
| 11,336,564 | B1* | 5/2022 | Mullis | H04L 61/10 |
| 2019/0116183 | A1* | 4/2019 | Hussain | H04L 63/08 |
| 2019/0173860 | A1* | 6/2019 | Sankaran | H04L 63/0272 |
| 2019/0342101 | A1* | 11/2019 | Hayes | H04L 63/1458 |
| 2020/0106719 | A1* | 4/2020 | Acharya | H04L 63/0485 |
| 2021/0297416 | A1* | 9/2021 | Gavraskar | H04L 67/142 |
| 2022/0140863 | A1* | 5/2022 | Gordon | H04L 9/0838 375/257 |

* cited by examiner

Primary Examiner — Sharif E Ullah
(74) Attorney, Agent, or Firm — Fletcher Yoder, P.C.

(57) ABSTRACT

A system includes an entropy device configured to generate and distribute input entropy data and an intelligent electronic device (IED) of an electric power distribution system. The IED is configured to perform operations that include receiving the input entropy data distributed by the entropy device, generating a set of keys using the input entropy data, and establishing a Media Access Control Security (MACsec) communication link using the set of keys.

19 Claims, 8 Drawing Sheets

SYSTEMS AND METHODS FOR USING ENTROPY DATA IN AN ELECTRIC POWER DISTRIBUTION SYSTEM

BACKGROUND

This disclosure relates to systems and methods for establishing a secure communication link between different components of an electric power distribution system using entropy data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power distribution systems carry electricity from a transmission system to residential communities, factories, industrial areas, and other electricity consumers. An electric power distribution system may include various intelligent electronic devices (IEDs) that may communicate with other components of the electric power distribution system. For example, an IED may receive and/or transmit a signal and/or data in order to perform a function (e.g., controlling a circuit breaker in response to electrical measurements of the electric power distribution system). Unfortunately, it may be difficult to establish a secure communication link between the IED and other components of the electric power distribution system to enable the components to securely communicate with one another.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, a system includes an entropy device configured to generate and distribute input entropy data and an intelligent electronic device (IED) of an electric power distribution system. The IED is configured to perform operations that include receiving the input entropy data distributed by the entropy device, generating a set of keys using the input entropy data, and establishing a Media Access Control Security (MACsec) communication link using the set of keys.

In an embodiment, a tangible, non-transitory, computer readable medium has instructions that, when executed by processing circuitry, are configured to cause the processing circuitry to perform operations that include generating a set of keys, generating input entropy data, and transmitting the set of keys, the input entropy data, or both, to an intelligent electronic device (IED) of an electric power distribution system for establishing a Media Access Control Security (MACsec) communication link.

In an embodiment, an intelligent electronic device (IED) of an electric power distribution system includes processing circuitry and a memory having instructions that, when executed by the processing circuitry, are configured to cause the processing circuitry to perform operations that include receiving input entropy data from an entropy device, generating a set of keys using the input entropy data, and establishing a Media Access Control security (MACsec) communication link with another component of the electric power distribution system via the set of keys.

DETAILED DESCRIPTION

Figure 1:
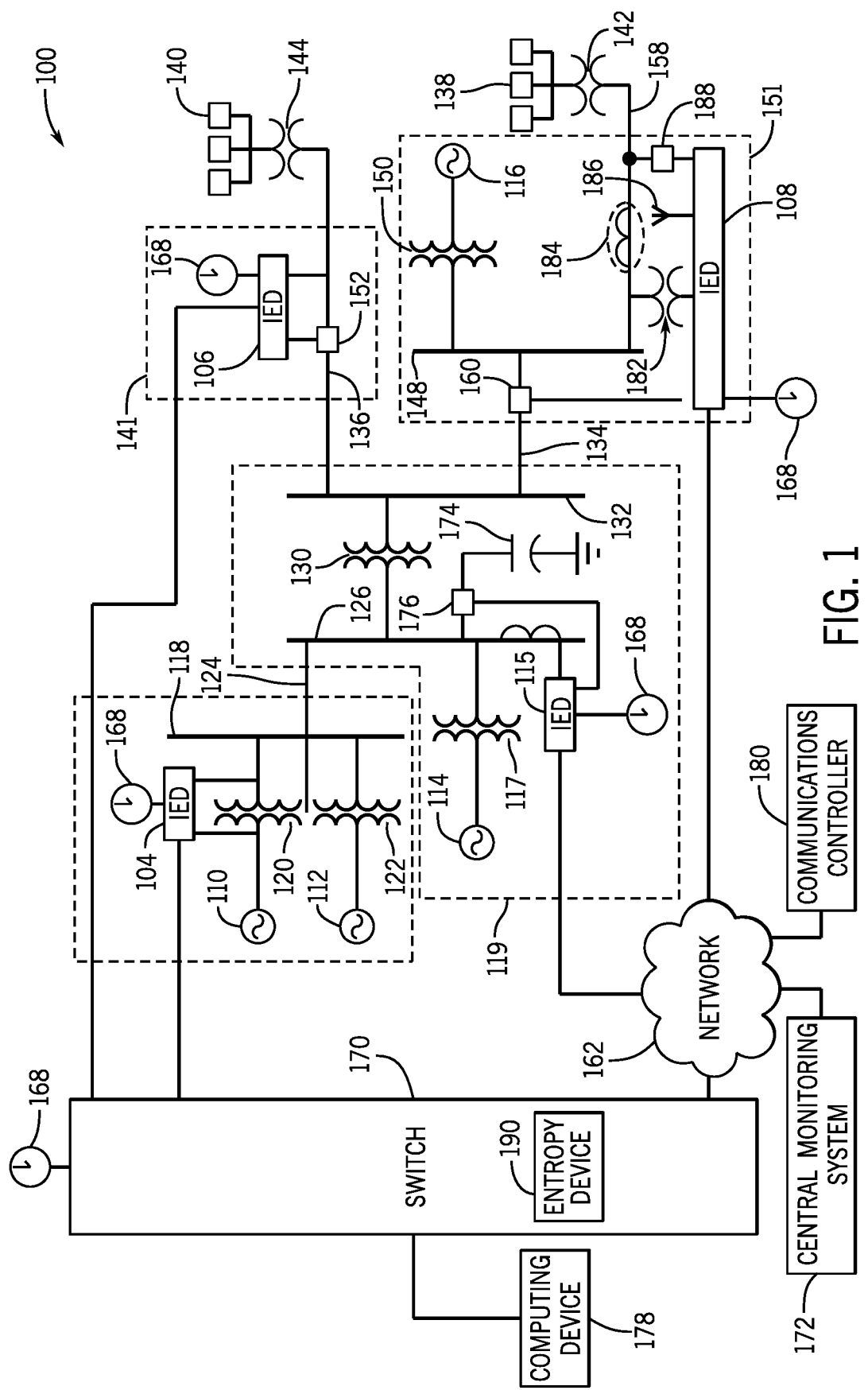
FIG. 1 is a schematic diagram of an embodiment of an electric power distribution system, in accordance with an embodiment of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to establishing a secure communication link between components of an electric power distribution system. Intelligent electronic devices (IEDs) may be used to control certain devices and to perform certain operations of the electric power distribution system. For example, an IED may be a relay that enables or blocks electrical power flow between other components of the electric power distribution system. The IED may, for instance, communicate with a computing device, and the IED may operate based on the communication with the computing device (e.g., based on a user input). Furthermore, multiple IEDs may transmit data, such as operating information or sensor data, to one another to control various functions of components of the electric power distribution system. As such, the IEDs may facilitate operation of the electric power distribution system.

In some embodiments, an IED may communicate with another component (e.g., another IED, a computing device, a user device) via a Media Access Control security (MACsec) communication link. A MACsec key agreement (MKA) protocol may be used to establish the MACsec communication link. During a normal operation of the MKA protocol, copies of the same connectivity association key (CAK) are distributed to both the IED and the other component to initially establish a MACsec key agreement (MKA) connectivity association (e.g., a new or updated MKA connectivity association). That is, the MKA connectivity association may be established upon verification that each of the IED and the other component possesses the CAK. Copies of the same security association key (SAK) may then be distributed between the IED and the other component via the MKA connectivity association. The IED and the other component may use their respective copies of the SAK to establish a MACsec communication link for communicating securely with one another. For example, each of the IED and the other component may use their copy of the SAK to encrypt data and/or decrypt encrypted data to be sent via the MACsec communication link in order to transmit data securely between one another.

An entropy device may be used to generate various keys (e.g., a CAK, an SAK) for establishing the MACsec communication link. For example, the entropy device may have a random number generator (RNG) that is used to generate the keys. The entropy device may distribute the generated keys to the IED and to the other component to enable establishment of the MACsec communication link between the IED and the other component. Additionally or alternatively, the entropy device may generate entropy data and may transmit the generated entropy data to the IED (e.g., upon receipt of a request transmitted by the IED for entropy data). The IED may use the entropy data received from the entropy device to generate the keys in order to establish the MACsec communication link between the IED and the other component. Accordingly, the IED may establish the MACsec communication link without having to receive keys from the entropy device. As such, MACsec communication links may be established even if the entropy device is not currently communicatively coupled to the IED or is otherwise unavailable to distribute keys to the IED.

With the preceding in mind, FIG. 1 is a schematic diagram of an electric power distribution system 100 that may generate, transmit, and/or distribute electric energy to various loads (e.g., different structures). The electric power distribution system 100 may use various IEDs 104, 106, 108, 115 to control certain aspects of the electric power distribution system 100. As used herein, an IED (e.g., the IEDs 104, 106, 108, 115) may refer to any processing-based device that monitors, controls, automates, and/or protects monitored equipment within the electric power distribution system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs For example, the electric power distribution system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power distribution system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power distribution system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power distribution system 100 using a communications network 162 and/or using a common time source, such as a Global Navigation Satellite System ("GNSS"), or the like.

The IEDs 104, 106, 108, 115 may be used for controlling various other equipment of the electrical power distribution system 100. By way of example, the illustrated electric power distribution system 100 includes electric generators 110, 112, 114, 116 and power transformers 117, 120, 122, 130, 142, 144, 150. The electric power distribution system 100 may also include electric power lines 124, 134, 136, 158 and/or busses 118, 126, 132, 148 to transmit and/or deliver power, circuit breakers 152, 160, 176 to control flow of power in the electric power distribution system 100, and/or loads 138, 140 to receive the power in and/or from the electric power distribution system 100. A variety of other types of equipment may also be included in electric power distribution system 100, such as a voltage regulator, a capacitor (e.g., a capacitor 174), a potential transformer (e.g., a potential transformer 182), a current sensor (e.g., a wireless current sensor (WCS) 184), an antenna 186, a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the distribution bus 132 via the power transformer 130 (e.g., a step-down transformer). Various electric power lines 136, 134 may be connected to the distribution bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the distribution bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch or gateway 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

Additionally, a communications controller 180 may interface with equipment in the communications network 162 to create an SDN that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162.

The switch 170 may enable or block data flow between any of the IEDs 104, 106, 108, 115. For example, during operation of the electric power distribution system 100, the IEDs 104, 106, 108, 115 may transmit data with one another to perform various functionalities for the electric power distribution system 100 by initially transmitting the data to the switch 170. The switch 170 may receive the data and may subsequently transmit the data to an intended recipient of the data. The switch 170 may also control data flow between one of the IEDs 104, 106, 108, 115 and another component communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power distribution system 100 via the switch 170 and/or to send data, such as a user input, to the electric power distribution system 100 via the switch 170. Thus, the switch 170 may enable or block operation of the electric power distribution system 100 via the computing device 178.

Additionally or alternatively, the switch 170 may enable the IEDs 104, 106, 108, 115 to directly communicate with one another and/or with the computing device 178 via MACsec communication links. To this end, the switch 170 may enable the MACsec communication links to be established between the IEDs 104, 106, 108, 115 and/or between the computing device 178 and one of the IEDs 104, 106, 108, 115. For instance, the switch 170 may generate and distribute keys, such as CAKs and/or SAKs, to the IEDs 104, 106, 108, 115 to enable the establishment of the MACsec communication links. To this end, the switch 170 may include an entropy device 190, such as a hardware or software module, that may use entropy data, which may include a random block of bit values, to seed the generation of secure keys (e.g., CAKs and SAKs) having a sufficiently random structure (e.g., keys that are difficult to be undesirably discovered or copied, such as via guessing). Indeed, the entropy device 190 may generate input entropy data, such as by receiving raw output from an analog noise source, reading random bits transmitted from a true random generator (TRNG), receiving digitized bits from a conditioning component, gathering data from a digital random number generator, using another suitable method, or any combination thereof. The entropy device 190 may be distinct from the IEDs 104, 106, 108, 115, allowing the entropy device to be replenished or replaced more often than the IEDs 104, 106, 108, 115 and without having to modify or manufacture each of the IEDs 104, 106, 108, 115 to include a separate entropy device. This may be particularly useful given the comparatively long expected lifespan of the IEDs 104, 106, 108, 115.

As an example, the switch 170 may act as a key server that may distribute various keys that enable a respective MACsec communication link to be established between the switch 170 and the IEDs 104, 106, 108, 115. That is, the switch 170 may distribute a CAK to one of the IEDs 104, 106, 108, 115 to establish an MKA connectivity association between the switch 170 and the IED, and the switch 170 may distribute an SAK to the IED to establish the MACsec communication link between the switch 170 and the IED. The switch 170 may use the respective MACsec communication links to transmit data between each of the IEDs 104, 106, 108, 115. For example, the switch 170 may receive data from a first IED via a first MACsec communication link, determine the intended recipient of the data is a second IED, and transmit the data to the second IED via a second MACsec communication link. As another example, the switch 170 may enable the IEDs 104, 106, 108, 115 to communicate directly with one another (e.g., without having to initially transmit data to the switch 170). That is, the switch 170 may distribute identical copies of the same CAK to two of the IEDs 104, 106, 108, 115 to establish an MKA connectivity association between the IEDs, and the switch 170 may distribute identical copies of the same SAK to the IEDs to establish a MACsec communication link between the IEDs Thus, the IEDs may transmit data directly to one another using their respective copies of the same SAK and without having to initially transmit data to the switch 170 (e.g., via a MACsec communication link between the switch 170 and the IED) for the switch 170 to subsequently transmit the data to the intended recipient.

In further embodiments, the switch 170 may enable any of the IEDs 104, 106, 108, 115 to act as a key server and generate keys for establishing MACsec communication links. To this end, the switch 170 may transmit input entropy data generated by the entropy device 190 to any of the IEDs 104, 106, 108, 115, such as at various frequencies, upon request, and so forth. Thus, each of the IEDs 104, 106, 108, 115 may use the input entropy data to generate a CAK for establishing an MKA connectivity association with another component and/or to generate an SAK for establishing a MACsec communication link with the other component. In this manner, the IEDs 104, 106, 108, 115 may establish MACsec communication links without having to receive keys from the switch 170. As such, after receiving the input entropy data from the switch 170, the IEDs 104, 106, 108, 115 may establish MACsec communication links even when the switch 170 is unavailable, such as during maintenance of the switch 170, power cycling events, and/or other suitable events in which the operation of the switch 170 may be affected. Although the present disclosure primarily discusses the use of MACsec communication links, any other suitable communication techniques may be used to enable data transfer between components of the electric power distribution system 100.

Figure 2:
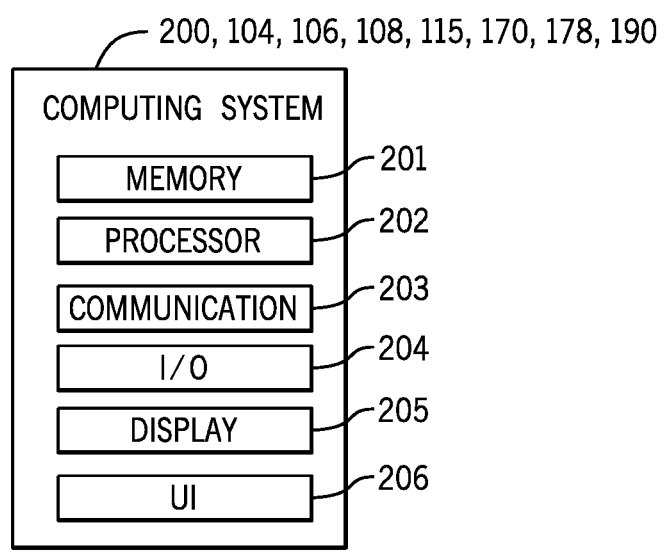
FIG. 2 is a schematic diagram of an embodiment of a computing system that may be incorporated in a component of an electric power distribution system, in accordance with an embodiment of the present disclosure.

FIG. 2 is a schematic diagram of an embodiment of a computing system 200 that may be incorporated within a component of the electric power distribution system 100, such as in any of the IEDs 104, 106, 108, 115, the switch 170, the computing device 178, and/or the entropy device 190. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another component of the electric power distribution system 100. That is, the communication system 203 enables the computing system 200 (e.g., of one of the IEDs 104, 106, 108, 115) to communication with another communication system 203 of another computing system 200 (e.g., of the switch 170), such as via MACsec. Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other suitable industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power distribution system 100, thereby enabling the user to observe an operation, a status, a parameter, other suitable information, or any combination thereof, of the electric power distribution system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

It should be noted that the respective computing systems 200 incorporated in the different components of the electric power distribution system 100 may include different components. For instance, the computing system 200 of the computing device 178 may include the display 205, but the computing system 200 of the entropy device 190 may not include the display 205. Indeed, the components included in each of the computing systems 200 may be based on a desirable operation of the respective computing systems 200.

Figure 3:
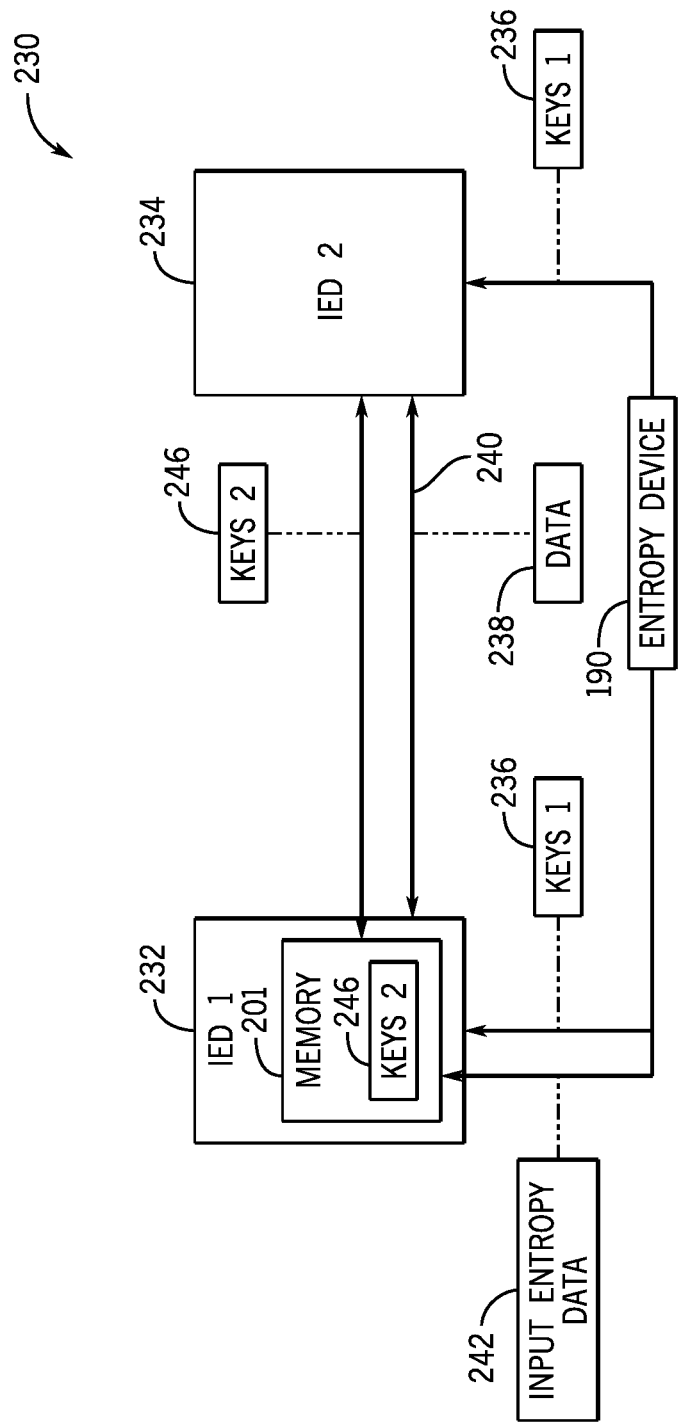
FIG. 3 is a schematic diagram of an embodiment of a communication system that includes an entropy device that transmits input entropy data to an IED, in accordance with an embodiment.

FIG. 3 is a schematic diagram of an embodiment of a communication system 230 that includes a first IED 232, a second IED 234, and the entropy device 190. In the illustrated embodiment, the entropy device 190 is an individual component, but the entropy device 190 may be a part of another component (e.g., the gateway or switch 170, a controller) in additional or alternative embodiments. In any case, the entropy device 190 may be communicatively coupled to the first IED 232 and to the second IED 234, such as via a respective MKA connectivity association, to enable a MACsec communication link to be established between the first IED 232 and the second IED 234. In some embodiments, the entropy device 190 may be a key server and may generate first keys 236 for distribution to the first IED 232 and to the second IED 234 via the respective MKA connectivity associations to establish the MACsec communication link between the IEDs 232, 234. For example, the entropy device 190 may include a TRNG that may be used for generating the first keys 236 as cryptographic keys with sufficiently random structure.

Indeed, the first keys 236 may include identical copies of a first CAK that is initially distributed by the entropy device 190. Based on verification that each of the IEDs 232, 234 possesses the CAK, the entropy device 190 may distribute identical copies of a first SAK of the first keys 236. The IEDs 232, 234 may use their respective copies of the first SAK to transmit data 238 securely between one another. For example, the first IED 232 may use the first SAK to encrypt data and then transmit the encrypted data to the second IED 234, and the second IED 234 may use the first SAK to decrypt the encrypted data received from the first IED 232. Similarly, the second IED 234 may use the first SAK to encrypt data and then transmit the encrypted data to the first IED 232, and the first IED 232 may use the first SAK to decrypt the encrypted data received from the second IED 234. In this manner, distribution of the SAK establishes a MACsec communication link 240 (e.g., a first MACsec communication link) that enables data to flow securely between the IEDs 232, 234.

The entropy device 190 may also communicate with the IEDs 232, 234 to enable one of the IEDs 232, 234 to become a key server that generates keys for establishing the MACsec communication link 240. As an example, the entropy device 190 may transmit input entropy data 242 generated by the TRNG of the entropy device 190, such as in response to receipt of a request from one of the IEDs 232, 234. In the illustrated embodiment, the entropy device 190 may transmit the input entropy data 242 (e.g., entropy data encrypted via a key-encryption-key derived from the CAK) to the first IED 232 via the MKA connectivity association between the entropy device 190 and the first IED 232, such as for storage in the memory 201 (e.g., non-volatile memory) of the first IED 232.

Using the input entropy data 242 received from the entropy device 190, the first IED 232 may generate second keys 246. For example, the first IED 232 may also include an RNG, such as a deterministic random bit generator or a cryptographically secure pseudorandom number, that may use the input entropy data 242 and other suitable data (e.g., entropy data from a manufacturer, from a user input, from a computing device) to generate the second keys 246. Indeed, the input entropy data 242 may be stored in an entropy pool containing other data, such as serial numbers, Media Access Control addresses, operating parameters (e.g., input currents, input voltages) associated with the power distribution system 100, or other unique identifiers to generate the second keys 246. In some embodiments, the first IED 232 may use the input entropy data 242 to generate the second keys 246 during specific conditions, such as in response to an identification of an event affecting the operation and/or the power cycle of multiple devices (e.g., the IEDs 232, 234, the switch 170). Although the present disclosure describes usage of the input entropy data 242 and of the entropy pool to generate keys for MACsec communication, the input entropy data 242 may additionally or alternatively be used to generate other data or information, such as cryptographic keys for other usages, a token used for authorization, user credentials (e.g., a username, a password), an identifier, and the like.

The second keys 246 may include a second CAK, and the first IED 232 may distribute a copy of the second CAK to the second IED 234 (e.g., via an adoption link between the first IED 232 and the second IED 234) to establish an MKA connectivity association between the first IED 232 and the second IED 234. Upon verification that the second IED 234 possesses the second CAK, the first IED 232 may distribute a copy of a second SAK of the second keys 246 to the second IED 234 via the MKA connectivity association, thereby establishing the MACsec communication link 240. The first IED 232 and the second IED 234 may then use their respective copies of the second SAK to communicate data securely with one another via the MACsec communication link 240. In additional or alternative embodiments, the first IED 232 may be configured to distribute the second CAK and/or the second SAK to other IEDs. As an example, the first IED 232 may distribute the second CAK to multiple IEDs that are communicatively coupled to the first IED 232 via a respective adoption link, and the first IED 232 may distribute the second CAK to such IEDs upon verification of their possession of the second CAK. As another example, instead of distributing the second CAK to other IEDs, the first IED 232 may determine which other IED(s) (e.g., the second IED 234) may possess the first CAK initially distributed by the entropy device 190, and the first IED 232 may distribute the second SAK to such IED(s) without initially distributing the second or updated CAK.

In further embodiments, the entropy device 190 may transmit input entropy data 242 to other IEDs, such as to the second IED 234 for establishing a secure communication link (e.g., an MKA connectivity association, a MACsec communication link) with another IED. In further embodiments, the first IED 232 may use the input entropy data 242 or additional input entropy data received from the entropy device 190 for establishing another secure communication with another IED and/or for updating the secure communication link established with the second IED 234. Indeed, the first IED 232 may use the same input entropy data 242 to generate different sets of keys for establishing secure communications.

In any case, by transmitting the input entropy data 242 to one or both of the IEDs 232, 234, the entropy device 190 enables the IEDs 232, 234 to generate keys for establishing the MACsec communication link 240 without having to obtain the keys directly from the entropy device 190. By way of example, the entropy device 190 may distribute keys to the IEDs 232, 234 when the entropy device 190 is available and is communicatively coupled to the IEDs 232, 234. However, in certain circumstances, such as during maintenance of the entropy device 190 and/or a suspension of the operation of the entropy device 190 (e.g., suspension of a power cycle of the entropy device 190 due to a power disruption), the entropy device 190 may not be able to distribute keys to the IEDs 232, 234. However, the IEDs 232, 234 may continue to establish the MACsec communication link 240 while the entropy device 190 is unavailable by generating keys via the input entropy data 242 received from the entropy device 190, thereby enabling data to be securely transmitted between the IEDs 232, 234. Indeed, in some embodiments, the entropy device 190 may be an existing component that can be frequently replaced or modified (e.g., to update the TRNG of the entropy device 190), whereas the IEDs 232, 234 may not be frequently replaced or modified. The distribution of the input entropy data 242 enables the IEDs 232, 234 to continue to operate, thereby enabling the electrical power distribution system 100 to continue to function and/or communicate, such as via the established MACsec communication links, while the entropy device 190 is undergoing replacement or modification. Additionally, the distribution of input entropy data 242 enables the IEDs 232, 234 to generate keys having sufficiently random structure without having to be manufactured, modified, and/or updated to include respective TRNGs, thereby reducing costs associated with implementing multiple TRNGs.

The entropy device 190 may transmit an amount of input entropy data 242 that enables the first IED 232 to generate a sufficient number of keys to establish MACsec communication links during an anticipated duration in which the entropy device 190 may be unavailable. For instance, the anticipated duration may include minutes (e.g., 1 minute, 5 minutes, 20 minutes, 50 minutes), hours, (e.g., 1 hour, 2 hours, 5 hours, 12 hours) days (e.g., 3 days, 4 days, 5 days), weeks (e.g., 2 weeks, 3 weeks, 4 weeks), or months (e.g., 1 month, 2 months, 3 months). Indeed, the entropy device 190 may transmit sufficient input entropy data 242 for generating a threshold number of keys (e.g., 2 keys, 3 keys, 4 keys, more than 4 keys). In certain embodiments, the first IED 232 may use keys at various frequencies (e.g., based on an operation of the first IED 232, based on an operation of the electric power distribution system 100). Accordingly, the entropy device 190 may adjust the amount of input entropy data 242 to be transmitted to the first IED 232, such as based on an operation of the first IED 232 and/or an operation of the electric power distribution system 100.

Furthermore, in certain embodiments, the IEDs 232, 234 may communicate with the entropy device 190 to request for additional input entropy data 242. For instance, the first IED 232 may use some of the currently stored input entropy data 242 to generate a number of keys, thereby reducing an amount of usable input entropy data 242. The first IED 232 may therefore request for additional input entropy data 242 in anticipation of further usage of the input entropy data 242. In such embodiments, the first IED 232 may transmit a request based on a determination associated with the input entropy data 242, such as based on a determination that an amount of the input entropy data 242 usable for generating keys is below a threshold amount, that an amount of the input entropy data 242 already used for generating keys is above a threshold amount, when a number of generated keys using currently stored input entropy data 242 is above a threshold number, and the like. Additionally or alternatively, the entropy device 190 may enable or block distribution of the input entropy data 242 to the first IED 232 based on the request. By way of example, the entropy device 190 may limit a number of times that input entropy data 242 is transmitted to the first IED 232 within a threshold duration of time. To this end, the entropy device 190 may determine whether a previous request for input entropy data 242 has been received from the first IED 232 within the threshold duration of time. The entropy device 190 may enable additional input entropy data 242 to be transmitted to the first IED 232 based on a determination that a previous request has not been received from the first IED 232 within the threshold duration of time, and the entropy device 190 may block additional input entropy data 242 from being transmitted to the first IED 232 based on a determination that a previous request has been received from the first IED 232 within the threshold duration of time. Such operation of the entropy device 190 may limit usage of the entropy device 190 to generate the input entropy data 242 and/or usage of the first IED 232 (e.g., of the memory 201) to store additional input entropy data 242.

In further embodiments, the entropy device 190 may transmit input entropy data 242 at a particular frequency, such as once every 3 weeks, 4 weeks, 1 month, 2 months, and so forth. That is, the entropy device 190 may continuously update the entropy pool stored at the first IED 232 regardless of whether current input entropy data 242 has been used to generate keys. In this way, the first IED 232 may have sufficiently updated data for generating keys at any given time.

Figure 4:
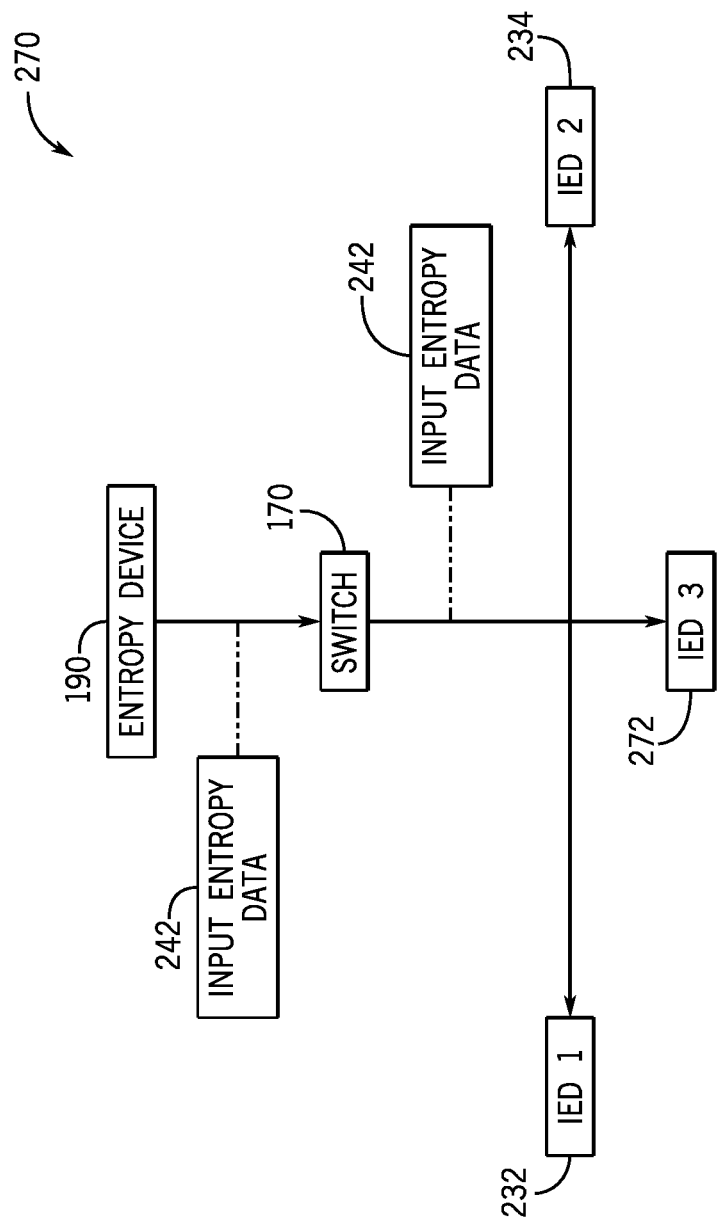
FIG. 4 is a schematic diagram of an embodiment of a communication system that includes an entropy device that transmits input entropy data to a switch for distribution to IEDs via a multicast transmission technique, in accordance with an embodiment.

FIG. 4 is a schematic diagram of a communication system 270 having the first IED 232, the second IED 234, a third IED 272, the switch 170, and the entropy device 190 that is separate from the switch 170. In the illustrated embodiment, the entropy device 190 may transmit or forward the input entropy data 242 to the switch 170, and the switch 170 may transmit or forward the received input entropy data 242 to the IEDs 232, 234, 272 so as to enable the IEDs 232, 234, 272 to generate keys for establishing MACsec communication links. For example, the illustrated communication system 270 may utilize a multicast (e.g., an Ethernet multicast) transmission technique in which the switch 170 may transmit the same input entropy data 242 received from the entropy device 190 to each of the IEDs 232, 234, 272. Indeed, the entropy device 190 may be communicatively coupled to the switch 170 via an MKA connectivity association and may transmit the encrypted input entropy data 242 to the switch 170 using the techniques described herein via the MKA connectivity association. Upon receipt of the input entropy data 242, the switch 170 may transmit the input entropy data 242 to each of the IEDs 232, 234, 272 via a respective MACsec communication link established between the switch 170 and the IEDs 232, 234, 272.

In certain embodiments, the switch 170 may communicate with the entropy device 190 to request for additional input entropy data 242. For instance, the switch 170 may determine that additional input entropy data 242 is to be transmitted to one or more of the IEDs 232, 234, 272 (e.g., based on monitoring of the IEDs 232, 234, 272, based on communication with one of the IEDs 232, 234, 272). As a result, the switch 170 may transmit the request to the entropy device 190 in order to receive the additional input entropy data 242 for distribution to the IEDs 232, 234, 272. For instance, since each of the IEDs 232, 234, 272 may use the same input entropy data 242, the switch 170 may transmit the request to the entropy device 190 based on a combined or total usage of the input entropy data 242 by the IEDs 232, 234, 272.

Figure 5:
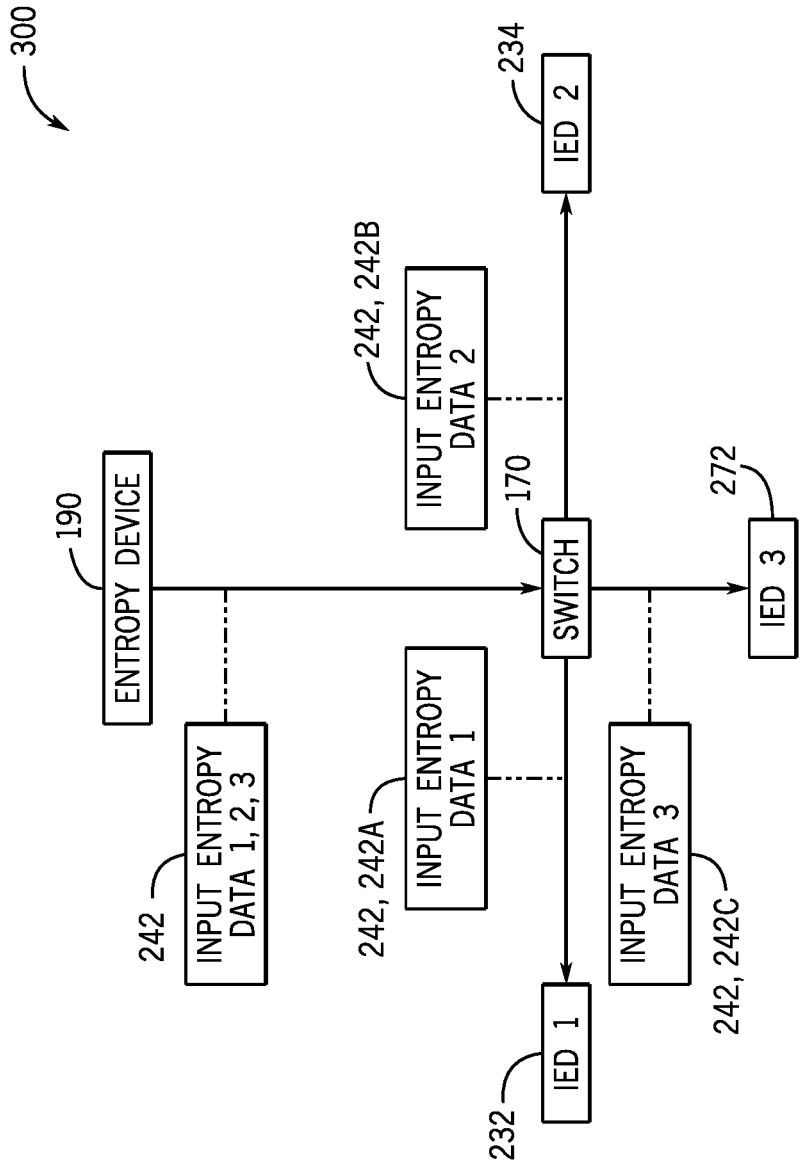
FIG. 5 is a schematic diagram of an embodiment of a communication system that includes an entropy device that transmits input entropy data to a switch for distribution to IEDs via a unicast transmission technique, in accordance with an embodiment.

FIG. 5 is a schematic diagram of an embodiment of a communication system 300 having the first IED 232, the second IED 234, the third IED 272, the switch 170, and the entropy device 190 that is separate from the switch 170. In the illustrated embodiment, the entropy device 190 may transmit or forward the input entropy data 242 to the switch 170, and the switch 170 may transmit or forward the received input entropy data 242 to the IEDs 232, 234, 272 via a unicast (e.g., an Ethernet unicast) transmission technique. That is, each of the IEDs 232, 234, 272 may receive different input entropy data 242. To this end, the entropy device 190 may transmit input entropy data 242 to the switch 170 along with an intended recipient to where the input entropy data 242 is to be transmitted (e.g., via a destination packet transmitted along with the input entropy data 242). In response, the switch 170 may process the input entropy data 242 to identify destination and/or recipient information associated with the input entropy data 242, thereby determining the particular IED to which the input entropy data 242 is to be transmitted by the switch 170.

By way of example, the entropy device 190 may transmit first input entropy data 242A, including an indication that the intended recipient of the first input entropy data 242A is the first IED 232, the switch 170 may identify that the intended recipient of the first input entropy data 242A is the first IED 232 upon receipt of the first input entropy data 242A, and the switch 170 may transmit the first input entropy data 242A to the first IED 232 without transmitting the first input entropy data 242A to the second IED 234 or to the third IED 272. Similarly, the entropy device 190 may transmit second input entropy data 242B, including an indication that the intended recipient of the second input entropy data 242B is the second IED 234, the switch 170 may identify that the intended recipient of the second input entropy data 242B is the second IED 234 upon receipt of the second input entropy data 242B, and the switch 170 may transmit the second input entropy data 242B to the second IED 234 without transmitting the second input entropy data 242B to the first IED 232 or to the third IED 272. Further, the entropy device 190 may transmit third input entropy data 242C, including an indication that the intended recipient of the third input entropy data 242C is the third IED 272, the switch 170 may identify that the intended recipient of the third input entropy data 242C is the third IED 272, and the switch 170 may transmit the third input entropy data 242C to the third IED 272 without transmitting the third input entropy data 242C to the first IED 232 or to the second IED 234. In this way, the switch 170 may enable only the intended recipient to receive a particular input entropy data 242, thereby enabling each of the IEDs 232, 234, 272 to receive a unique set of input entropy data 242. As a result, each of the IEDs 232, 234, 272 may use different input data for generating their respective keys.

In the illustrated example, the switch 170 may receive a request from any of the IEDs 232, 234, 272 for additional input entropy data 242. The switch 170 may indicate the particular IED for which additional input entropy data 242 is to be generated. For instance, in response to receiving a request from the first IED 232, the switch 170 may transmit data to the entropy device 190 indicating that the first IED 232 in particular is to receive additional input entropy data 242. In response, the entropy device 190 may transmit the additional input entropy data 242 to the switch 170 along with an indication that the first IED 232 is to receive the additional input entropy data 242, and the switch 170 may transmit the additional input entropy data 242 without sending other additional input entropy data 242 to the second IED 234 or to the third IED 272.

Each of FIGS. 6-8 below illustrates a method for using input entropy data for secure communications within the electric power distribution system 100. In some embodiments, each of the methods may be performed by a single respective component, such as by the computing system 200 (e.g., the processor 202). In additional or alternative embodiments, multiple components may perform the procedures for a single one of the methods. It should also be noted that additional procedures may be performed with respect to the described methods. Moreover, certain procedures of the depicted methods may be removed, modified, and/or performed in a different order. Further still, the procedures of any of the respective methods may be performed in parallel with one another, such at the same time and/or in response to one another.

Figure 6:
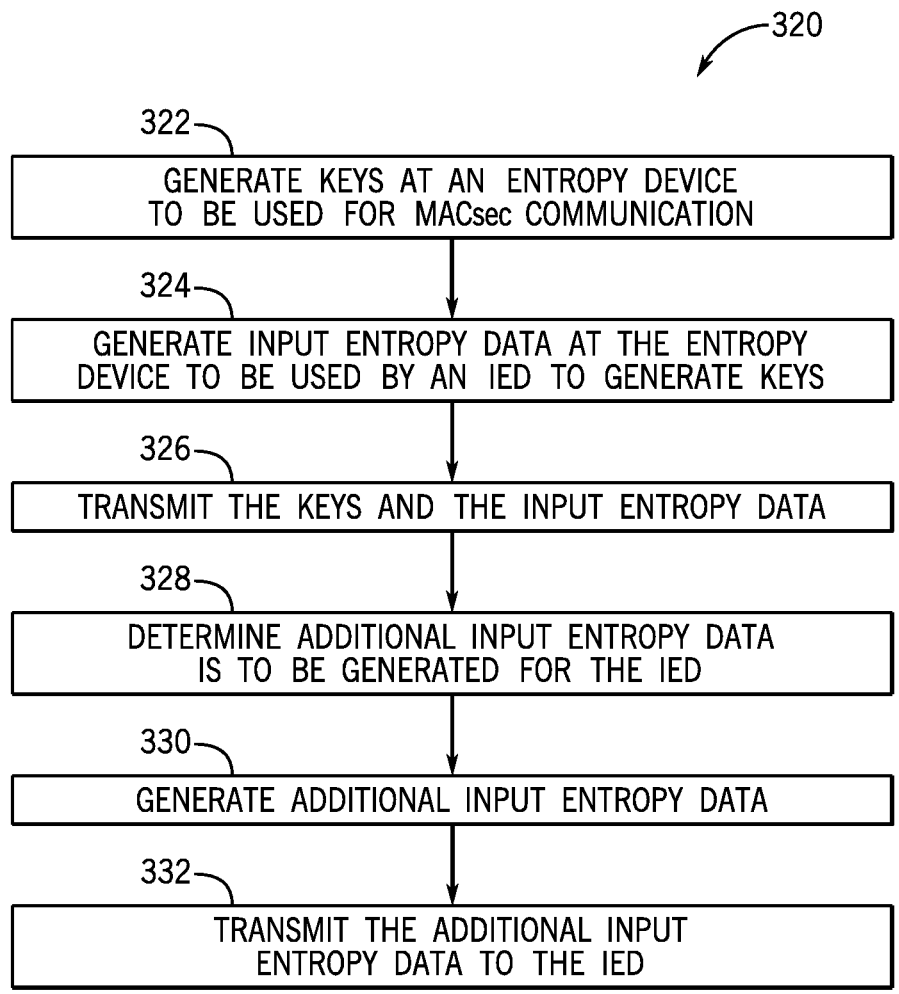
FIG. 6 is a flowchart of an embodiment of a method for distributing input entropy data to establish Media Access Control security (MACsec) communication links, in accordance with an embodiment.

FIG. 6 is a flowchart of an embodiment of a method 320 for distributing input entropy data 242 to establish MACsec communication links, such as between any of the IEDs 232, 234, 272. The method 320 is described from the perspective of the entropy device 190. At block 322, the entropy device 190 may generate keys to be used for establishing MACsec communication links, such as via the TRNG of the entropy device 190. At block 324, the entropy device 190 may also generate input entropy data 242 to be used by an IED for generating keys (e.g., via an RNG of the IED) that may be used for establishing MACsec communication links.

At block 326, the entropy device 190 may transmit the generated keys and/or the input entropy data 242 to the IED, such as via an MKA connectivity association between the entropy device 190 and the IED, via the switch 170 communicatively coupled to the IED, and the like. In some embodiments, the entropy device 190 may transmit the input entropy data 242 separately from the keys (e.g., upon receiving a request from the IED, at a particular frequency or time interval). In any case, the entropy device 190 may transmit the generated keys to the IED, thereby acting as a key server for establishing the MACsec communication links between the IED and another component (e.g., another IED, the computing device 178). Further, the entropy device 190 may transmit the input entropy data 242 to enable the IED to act as a key server for generating and distributing keys to establish MACsec communication links between the IED and another component without having to receive the keys from the entropy device 190.

At block 328, the entropy device 190 may determine additional input entropy data 242 is to be generated for the IED As an example, the entropy device 190 may receive a request to generate additional input entropy data 242 from the IED, from the switch 170, from the computing device 178, from a different controller, and so forth. As another example, the entropy device 190 may monitor operation of the IED and/or of the switch 170 and may determine that the additional input entropy data 242 is to be generated based on the monitored operation, such as based on a determined usage of the input entropy data 242 previously transmitted to the IED As a further example, the entropy device 190 may generate updated input entropy data at a particular frequency. Therefore, the entropy device 190 may determine additional input entropy data 242 is to be generated after a threshold block of time has elapsed. In any case, at block 330, the entropy device 190 may generate the additional input entropy data in response to determining the additional input entropy data is to be generated. At block 332, the entropy device 190 may transmit the generated additional input entropy data 242 to the IED, thereby enabling the IED to continue to generate and distribute keys to establish MACsec communication links. In this way, the entropy device 190 may repeat the performance of the procedures described with respect to blocks 324 and 326 regarding the generation and distribution of input entropy data 242 during operation of the entropy device 190.

It should also be noted that the entropy device 190 may also repeat the performance of the procedures described with respect to blocks 322 and 326 regarding the generation and distribution of keys. Indeed, the entropy device 190 may generate additional keys in response to receipt of a request, based on monitoring operation of another component, at a particular frequency, and the like. The entropy device 190 may then transmit the generated additional keys to the IED to establish MACsec communication links.

Figure 7:
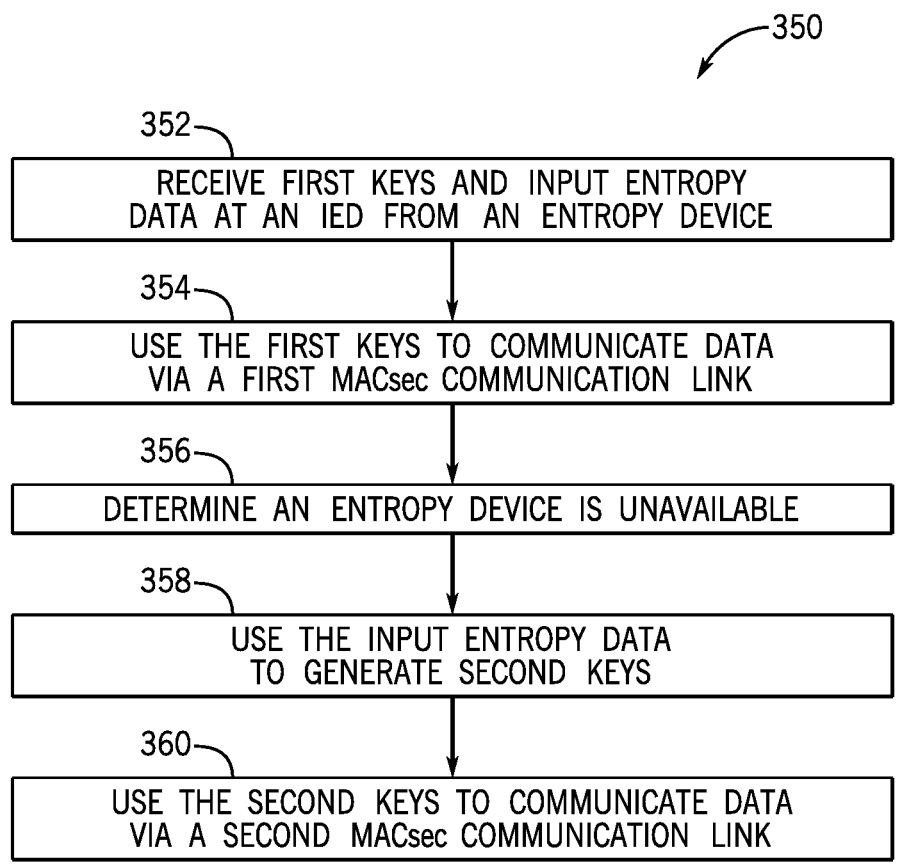
FIG. 7 is a flowchart of an embodiment of a method for establishing MACsec communication links via data received from an entropy device, in accordance with an embodiment.

FIG. 7 is a flowchart of an embodiment of a method 350 for establishing MACsec communication links. The method 350 is described from the perspective of an IED (e.g., any of the IEDs 104, 106, 108, 115, 232, 234, 272). At block 352, the IED may receive a first set of keys and/or input entropy data 242 from the entropy device 190. In some embodiments, the IED may receive the input entropy data 242 separately from the first set of keys, such as upon transmitting a request to the entropy device 190 (e.g., after receiving the first set of keys) and/or at a predetermined frequency or time interval. At block 354, the IED may use the first set of keys to communicate data via a first MACsec communication link. For instance, the IED may use a first CAK of the first set of keys to establish a first MKA connectivity association with another component (e.g., another IED, the computing device 178), and the IED may use a first SAK of the first set of keys to establish the first MACsec communication link. Indeed, the IED may use the first SAK to encrypt data to be transmitted via the first MACsec communication link and/or to decrypt encrypted data received via the first MACsec communication link. Further, the IED may store the input entropy data 242 received from the entropy device 190 such that the input entropy data 242 is readily available for use at a later time.

At block 356, the IED may determine the entropy device 190 is unavailable or that the IED is otherwise unable to receive keys from the entropy device 190 for establishing additional MACsec communication links. For example, the IED may determine an interruption in data transmitted between the IED and the entropy device 190, and/or the IED may receive an indication (e.g., from the computing device 178, from a controller) that the entropy device 190 is unavailable, such as from a power event. In response, at block 358, the IED may use the input entropy data 242 previously received from the entropy device 190 and currently stored at the IED to generate a second set of keys. For example, the IED may generate the second set of keys upon a determination that updated keys (e.g., SAKs) are to be used, such as in response to identification of a power cycle event that affects multiple IEDs (e.g., IEDs possessing the same CAKs).

At block 360, the IED may use the second set of keys to communicate data via a second MACsec communication link. For example, the IED may use a second CAK of the second set of keys to establish a second MKA connectivity association with another component, and the IED may use a second SAK of the second set of keys to establish the second MACsec communication link. The IED may then use the second SAK to encrypt data to be transmitted via the second MACsec communication link and/or to decrypt encrypted data received via the second MACsec communication link. In this manner, when the entropy device 190 is unavailable or otherwise unable to act as a key server, the IED may act as a key server to generate and distribute the second set of keys to establish additional MACsec communication links.

The IED may also continue to monitor whether the entropy device 190 is available to act as a key server and, in response to a determination that the entropy device 190 is available, the IED may receive subsequent keys from the entropy device 190 rather than generate keys for establishing MACsec communication links. In other words, the IED may act as a key server when the entropy device 190 is unavailable, but not when the entropy device 190 is available. In some embodiments, the IED may indicate whether the IED is receiving keys from the entropy device 190 and/or is generating keys for establishing MACsec communication links. By way of example, the IED may output an indication, such as by transmitting a notification (e.g., to the computing device 178), presenting a visualization (e.g., via the display 205), presenting a sound, providing an alarm signal (e.g., an alarm contact trigger, an alarm contact pulse), outputting another suitable indication, or any combination thereof. Thus, the IED may notify a user, such as an operator or a technician, whether the entropy device 190 is currently unavailable and/or whether the IED is acting as a key server.

Figure 8:
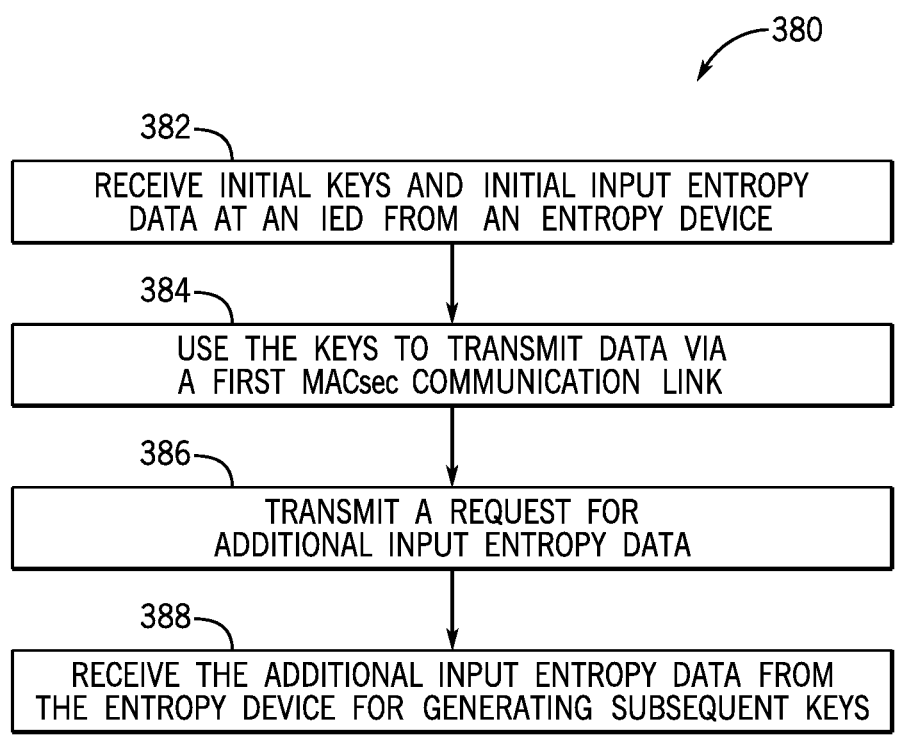
FIG. 8 is a flowchart of an embodiment of a method for communicating with an entropy device to receive input entropy data, in accordance with an embodiment.

FIG. 8 is a flowchart of an embodiment of a method 380 for communicating with the entropy device 190 to receive additional input entropy data 242. The method 380 is described from the perspective of an IED At block 382, the IED may receive an initial set of keys and initial input entropy data 242 from the entropy device 190. At block 384, the IED may use the initial set of keys received from the entropy device 190 to establish a MACsec communication link and/or to communicate data via the MACsec communication link.

At block 386, the IED may transmit a request to the entropy device 190 for additional input entropy data 242. In an example, the IED may use a portion of the initial input entropy data 242 previously received from the entropy device 190, such as during a block of time in which the entropy device 190 was unavailable, in order to generate keys for establishing MACsec communication links. Therefore, the IED may transmit the request to increase the amount of input entropy data 242 that may be used to generate additional keys. In another example, the TED may request to update a stored entropy pool at a particular frequency. Thus, the IED may transmit the request for additional input entropy data 242 that is used to update stored input entropy data 242.

At block 388, the IED may receive the additional input entropy data 242 from the entropy device 190 in response to transmission of the request to the entropy device 190. The TED may store the additional input entropy data 242 for use at a later time, such as for generating subsequent keys to establish a MACsec communication link when the entropy device 190 is unavailable. It should be noted that the TED may repeat the procedures described with respect to blocks 382-388 to continue to receive keys from the entropy device 190 (e.g., when the entropy device 190 is available) and/or to request for subsequent input entropy data 242 for establishing subsequent MACsec communication links.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A system, comprising: an entropy device configured to generate and distribute input entropy data; and an intelligent electronic device (IED) of an electric power distribution system, wherein the IED is configured to perform operations comprising: receiving the input entropy data distributed by the entropy device; generating a set of keys using the input entropy data, wherein the set of keys comprises a connectivity association key (CAK) and a security association key (SAK); distributing a copy of the CAK to an additional IED; establishing a Media Access Control Security (MACsec) key agreement (MKA) connectivity association upon verification of the additional IED possessing the copy of the CAK: and distributing a copy of the SAK to the additional IED via the MKA connectivity association to establish a MACsec communication link between the IED and the additional IED.

2. The system of claim 1, wherein the IED is configured to generate the set of keys using the input entropy data in response to a determination that the entropy device is unavailable.

3. The system of claim 1, wherein the entropy device is configured to generate an additional set of keys and to distribute the additional set of keys to the IED.

4. The system of claim 3, wherein the IED is configured to establish an additional MACsec communication link using the additional set of keys received from the entropy device.

5. The system of claim 1, wherein the IED is configured to use the SAK to encrypt data and transmit the encrypted data to the additional IED via the MACsec communication link, the IED is configured to use the SAK to decrypt encrypted data received from the additional IED via the MACsec communication link, or both.

6. The system of claim 1, comprising a switch communicatively coupled to the entropy device and to the IED, wherein the entropy device is configured to forward the input entropy data to the switch, and the switch is configured to forward the input entropy data to the IED.

7. The system of claim 6, wherein the switch is configured to forward the input entropy data to the IED via an Ethernet multicast transmission or an Ethernet unicast transmission.

8. The system of claim 1, comprising a switch, a gateway, a controller, or any combination thereof, comprising the entropy device.

9. A tangible, non-transitory, computer readable medium comprising instructions that, when executed by processing circuitry, are configured to cause the processing circuitry to perform operations comprising: generating a set of keys; generating input entropy data; and transmitting the set of keys and the input entropy data, to an intelligent electronic device (IED) of an electric power distribution system for establishing a Media Access Control Security (MACsec) communication link; receiving the input entropy data distributed by the entropy device; generating a set of keys using the input entropy data, wherein the set of keys comprises a connectivity association key (CAK) and a security association key (SAK); distributing a copy of the CAK to an additional IED; establishing a Media Access Control Security (MACsec) key agreement (MKA) connectivity association upon verification of the additional IED possessing the copy of the CAK: and distributing a copy of the SAK to the additional IED via the MKA connectivity association to establish a MACsec communication link between the IED and the additional IED.

10. The tangible, non-transitory, computer readable medium of claim 9, wherein the instructions, when executed by the processing circuitry, are configured to cause the processing circuitry to transmit the input entropy data in response to a receipt of a request, based on an operation associated with the electric power distribution system, after a threshold duration of time has elapsed, or any combination thereof.

11. The tangible, non-transitory, computer readable medium of claim 9, wherein the instructions, when executed by the processing circuitry, are configured to cause the processing circuitry to receive data from a sensor of the electric power distribution system and to generate the set of keys, the input entropy data, or both, based on the data received from the sensor.

12. The tangible, non-transitory, computer readable medium of claim 9, wherein the instructions, when executed by the processing circuitry, are configured to generate the set of keys, the input entropy data, or both, via a true random number generator.

13. The tangible, non-transitory, computer readable medium of claim 9, wherein the instructions, when executed by the processing circuitry, are configured to transmit the set of keys, the input entropy data, or both, via a MACsec key agreement connectivity association established with the IED.

14. A tangible, non-transitory, computer readable medium comprising instructions that, when executed by processing circuitry, are configured to cause the processing circuitry to perform operations comprising: receiving input entropy data distributed by an entropy device; generating a set of keys using the input entropy data, wherein the set of keys comprises a connectivity association key (CAK) and a security association key (SAK); distributing a copy of the CAK to an intelligent electronic device (IED); establishing a Media Access Control Security (MACsec) key agreement (MKA) connectivity association upon verification of the IED possessing the copy of the CAK; and distributing a copy of the SAK to the IED via the MKA connectivity association to establish a MACsec communication link with the IED.

15. The tangible, non-transitory, computer readable medium of claim 14, wherein the instructions, when executed by the processing circuitry, are configured to cause the processing circuitry to perform operations comprising: receiving an additional set of keys from the entropy device, wherein the additional set of keys comprises an additional CAK and an additional SAK; distributing a copy of the additional CAK of the additional set of keys to an additional IED; establishing an additional MKA connectivity association upon verification of the additional IED possessing the copy of the additional CAK; and distributing a copy of the additional SAK to the additional IED via the additional MKA connectivity association to establish an additional MACsec communication link with the additional IED.

16. The tangible, non-transitory, computer readable medium of claim 15, wherein the instructions, when executed by the processing circuitry, are configured to cause the processing circuitry to perform operations comprising: generating the set of keys using the input entropy data in response to determining that the entropy device is unavailable; and receiving the additional set of keys from the entropy device while the entropy device is available.

17. The tangible, non-transitory, computer readable medium of claim 14, wherein the instructions, when executed by the processing circuitry, are configured to cause the processing circuitry to output an indication associated with generating the set of keys using the input entropy data, and the indication comprises a notification, a visualization, a sound, an alarm signal, or any combination thereof.

18. The tangible, non-transitory, computer readable medium of claim 14, wherein the instructions, when executed by the processing circuitry, are configured to cause the processing circuitry to perform operations comprising: transmitting a request for additional input entropy data to the entropy device; receiving the additional input entropy data from the entropy device upon transmitting the request for the additional input entropy data to the entropy device; and generating an additional set of keys using the additional input entropy data.

19. The tangible, non-transitory, computer readable medium of claim 18, wherein the instructions, when executed by the processing circuitry, are configured to cause the processing circuitry to perform operations comprising: distributing a copy of an additional CAK of the additional set of keys to an additional IED; establishing an additional MKA connectivity association upon verification of the additional IED possessing the copy of the additional CAK; and distributing a copy of an additional SAK to the additional IED via the additional MKA connectivity association to establish an additional MACsec communication link with the additional IED.

* * * * *